(12) United States Patent
Callaway et al.

(10) Patent No.: US 11,738,847 B2
(45) Date of Patent: Aug. 29, 2023

(54) INTERFACE UNIT

(71) Applicant: Kongsberg Maritime CM AS, Alesund (NO)

(72) Inventors: Mark Callaway, Alesund (NO); Anite Lee Jin Teo, Lincoln (GB); Nils Sigmund Breivik, Myklebost (NO); Shaun Dawson, Derby (GB)

(73) Assignee: KONGSBERG MARITIME AS, Horten (NO)

( * ) Notice: Subject to any disclaimer, the term of this patent is extended or adjusted under 35 U.S.C. 154(b) by 469 days.

(21) Appl. No.: 16/892,067

(22) PCT Filed: Dec. 6, 2018

(86) PCT No.: PCT/NO2018/050303
§ 371 (c)(1),
(2) Date: Jun. 3, 2020

(87) PCT Pub. No.: WO2019/112442
PCT Pub. Date: Jun. 13, 2019

(65) Prior Publication Data
US 2020/0369358 A1  Nov. 26, 2020

(30) Foreign Application Priority Data

Dec. 7, 2017 (NO) .................................. 20171950

(51) Int. Cl.
*B63H 25/42* (2006.01)
*G05D 1/02* (2020.01)
(Continued)

(52) U.S. Cl.
CPC ........... *B63H 25/42* (2013.01); *G05D 1/0206* (2013.01); *B63B 35/66* (2013.01); *B63B 49/00* (2013.01);
(Continued)

(58) Field of Classification Search
CPC ......... B63H 24/42; B63B 35/66; B63B 49/00; G05D 1/0206
See application file for complete search history.

(56) References Cited

FOREIGN PATENT DOCUMENTS

CN  109153433 A  *  1/2019
EP  2837553  2/2015
(Continued)

OTHER PUBLICATIONS

Norwegian Search Report mailed in NO 20171590 dated Jun. 26, 2018.

(Continued)

*Primary Examiner* — S. Joseph Morano
*Assistant Examiner* — Jovon E Hayes
(74) *Attorney, Agent, or Firm* — Wissing Miller LLP

(57) ABSTRACT

An interface unit providing an interface between a control and sensor system of an assisted vessel with thrust capabilities and a master dynamic positioning system. The master dynamic positioning system is configured to control a number of auxiliary vessels as one unit and control the thrust capabilities of the assisted vessel for assisting in maneuvering of the assisted vessel. A master dynamic positioning system comprises the interface unit above. A system for assisting in maneuvering of a vessel with thrust capabilities comprises the master dynamic positioning system controlling a number of auxiliary vessels as one unit for assisting in maneuvering of an assisted vessel. A dynamic positioning system of each of the auxiliary vessels is controlled by the master dynamic positioning system. The master dynamic positioning system controls the thrust capabilities of the assisted vessel. The master dynamic positioning system may be provided on-board a tugboat.

28 Claims, 4 Drawing Sheets

(51) Int. Cl.
- *B63B 35/66* (2006.01)
- *B63B 49/00* (2006.01)
- *B63B 35/00* (2020.01)
- *B63H 5/125* (2006.01)
- *B63H 25/04* (2006.01)

(52) U.S. Cl.
CPC ... *B63B 2035/007* (2013.01); *B63B 2035/008* (2013.01); *B63H 2005/1254* (2013.01); *B63H 2025/045* (2013.01)

(56) References Cited

FOREIGN PATENT DOCUMENTS

| | | | | |
|---|---|---|---|---|
| GB | 2417017 | | 2/2006 | |
| GB | 2417017 A | * | 2/2006 | |
| JP | 63222994 A | | 9/1988 | |
| RU | 2417017 C1 | * | 4/2011 | ............ B63B 35/00 |
| WO | 2012041680 | | 4/2012 | |
| WO | 2015181626 | | 12/2015 | |
| WO | 2016023080 | | 2/2016 | |
| WO | 2017167884 | | 10/2017 | |
| WO | 2017167893 | | 10/2017 | |
| WO | WO-2017167884 A1 | * | 10/2017 | |
| WO | WO-2019112442 A1 | * | 6/2019 | |

OTHER PUBLICATIONS

International Search Report mailed in PCT/NO2018/050303 dated Feb. 28, 2019.

Supplementary European Search Report mailed in European Application No. 18886362.5 dated May 19, 2021, pp. 1-12.

Office Action and Search Report mailed in corresponding Chinese Application 201880085792.3 dated Feb. 9, 2023 (19 pages) and English translation of the Office Action and Search Report (30 pages).

* cited by examiner

//INTERFACE UNIT

CROSS-REFERENCE TO RELATED APPLICATIONS

This application is a 371 of PCT/NO2018/050303 filed on Dec. 6, 2018, published on Jun. 13, 2019 under publication number WO 2019/112442 A1, which claims priority benefits from Norwegian Patent Application No. 20171950 filed Dec. 7, 2017, both of which are incorporated herein in their entirety by reference.

FIELD OF THE INVENTION

The invention relates to an interface unit providing an interface between a master dynamic positioning (DP) system controlling a number of auxiliary vessels, e.g. tugboats, and a control system on board an assisted vessel. The invention also concerns a master dynamic positioning system comprising the interface unit, a tugboat provided with the master dynamic positioning system, and a method and a system for assisting in maneuvering of the assisted vessel, as well as a computer program for performing the method.

DESCRIPTION OF THE RELATED ART

A tug, or tugboat, is a powerful boat or ship used for towing and pushing marine vessels. By towing and pushing the marine vessel, one or more tugs may manoeuvre the vessel during difficult maneuvering operations, such as in a harbour, in a narrow canal, in hazardous areas where assisting tugs are required, or during rescue operations of vessels in distress. The one or more tugs may be controlled by a dynamic positioning system (DP system). Dynamic positioning (DP) involves automatic or semi-automatic control of a vessel's position and heading by using its own propellers and thrusters with respect to one or more position references. The dynamic positioning (DP) system may keep the position of the vessel fixed within given parameters or manoeuvre the vessel in a way that it could not do without the dynamic positioning system. A dynamic positioning (DP) system may manoeuvre a vessel based on a number of input parameters. These input parameters may e.g. come from:
  sensors for location, heading, speed;
  sensors for external factors such as wind, waves, current; and
  input from a user to execute a mission such as maintain position or move in a particular pattern.

Control algorithms of the dynamic positioning (DP) system takes in the sensor and user input parameters and executes manoeuvre of the vessel by controlling the on-board propellers and thrusters even with changes in external forces.

The assisting tugs may also each be remotely controlled by a central control unit and operated together to move the assisted vessel to the desired location. The number of tugs used in a tugging operation may depend on the size of the vessel. Each tug may be provided with a global positioning system (GPS) and the GPS position of each tugboat wirelessly transmitted to the central control unit. The real-time GPS location of each tugboat may then be taken into account when controlling each tugboat. The central control unit may also take into account in the maneuvering operation real-time sensor data from each tugboat for wind direction and speed, and roll and pitch inclinometers. However, the central control wirelessly controls each tugboat to move the assisted vessel as if the assisted vessel does not have any capabilities of its own.

Marine vessels comes in a variety of forms adapted to the specific use, e.g. ranging from but not limited to tugboats, ferries, cruise ships, standby ships, fishing boats, cargo ships, container ships, LNG ships, chemical tankers. All marine vessels may have different levels of autonomy, control and sensor systems. Marine vessels often have simple automation and control systems. These systems may not be linked with sophisticated systems like a dynamic positioning (DP) system. The control and sensor system on a marine vessel may today not communicate or interact with control and sensor systems or dynamic positioning systems on-board other marine vessels. This may pose a risk in operations when a marine vessel is assisted in maneuvering by auxiliary vessels e.g. by one or more tugboats.

SUMMARY OF THE INVENTION

The invention provides an interface unit providing an interface between a control and sensor system of an assisted vessel with thrust capabilities and a master dynamic positioning system. The master dynamic positioning system is configured to control a number of auxiliary vessels as one unit and control the thrust capabilities of the assisted vessel for assisting in maneuvering of the assisted vessel.

The interface unit may be adapted to transmit information from a control and sensor system of the assisted vessel to the master dynamic positioning system.

The interface unit may further comprise an inertial navigation system. The inertial navigation system may comprise a global positioning system and a motion reference unit.

The master dynamic positioning system may be placed on one of the auxiliary vessels or on a land based facility.

The information from the control and sensor system of the assisted vessel transmitted to the master dynamic positioning system may include at least one of:
  a rudder angle of the assisted vessel,
  a pitch angle of the controllable pitch propeller (CPP) of the assisted vessel,
  a propeller revolutions per minute (RPM) of the assisted vessel,
  an engine revolutions per minute (RPM) of the assisted vessel,
  an engine power of the assisted vessel,
  a thruster angle of the assisted vessel,
  a thruster revolutions per minute (RPM) of the assisted vessel, or
  a thruster power of the assisted vessel.

The information from the control and sensor system of the assisted vessel transmitted to the master dynamic positioning system may further include at least one of:
  global position of the assisted vessel,
  a speed of the assisted vessel,
  a heading of the assisted vessel, or
  automatic identification system (AIS) assisted parameters such as geometry and load conditions.

The interface unit may be portable. The interface unit may be easily connectable to the control and sensor systems on board the assisted vessel. The interface unit may be configured to transmit commands from the master dynamic positioning system to the control and sensor system of the assisted vessel to control the thrust capabilities of the assisted vessel. The interface unit may be configured to enable human control of the master dynamic positioning system. Human control may include commands from a ship captain, a pilot, a tug master or shore based operators. The interface unit may further be configured to provide audio or visual commands to a crew on board the assisted vessel for control by the crew of the thrust capabilities of the assisted vessel.

The interface unit may further comprise a communication module configured to communicate with the control and sensor system on board the assisted vessel. The interface unit may further comprise a dynamic positioning interface module configured to communicate with the master dynamic positioning system.

The interface unit may further comprise a conversion module configured for converting signals from the control and sensor system on board the vessel to signals understandable by the master dynamic positioning system. The conversion module may include a database with conversion information between the control and sensor system on board the assisted vessel and the master dynamic positioning system.

The communication module may be connectable to the assisted vessel control and sensor system via a cable based or wireless connection. The wireless connection may be at least one of satellite, antennae or radio signals. The wireless connection may be a secure connection. A secure connection may be implemented in the communication between at least one of:
- the dynamic positioning interface module and the master dynamic positioning system,
- the dynamic positioning interface module and the control and sensor system of the assisted vessel, or
- the master dynamic positioning system and the auxiliary vessels.

The thrust capabilities may comprise at least one of a rudder, a propeller, an azimuthing thruster, a waterjet, or a tunnel thruster. The auxiliary vessels may be tugboats.

The invention also provides a master dynamic positioning system comprising an interface unit as defined above. The master dynamic positioning system may comprise a dynamic positioning control system configured to control the auxiliary vessels and the thrust capabilities of the assisted vessel based on a plurality of input parameters, the plurality of input parameters comprising at least one of:
- speed of the assisted vessel,
- heading of the assisted vessel,
- position of the assisted vessel,
- surface traffic,
- meteorological data,
- environmental data,
- speed of the auxiliary vessels,
- heading of the auxiliary vessels,
- position of the auxiliary vessels,
- wire, rope tension or winch capacity of the auxiliary vessels, or
- electronic navigational charts.

The invention also provides a system for assisting in maneuvering of a vessel with thrust capabilities the system comprising:
- a master dynamic positioning system as defined above controlling a number of auxiliary vessels as one unit for assisting in maneuvering of an assisted vessel, and
- an interface unit as described above.

The invention also provides a method for assisting in maneuvering of a vessel with thrust capabilities, the method comprising:
- controlling a number of auxiliary vessels as one unit for assisting in maneuvering of the assisted vessel by controlling a dynamic positioning system of each of the auxiliary vessels by a master dynamic positioning system, and
- controlling the thrust capabilities of the assisted vessel by the master dynamic positioning system.

The master dynamic positioning system may be provided with an interface unit enabling control of the thrust capabilities on board the assisted vessel. The master dynamic positioning system may further receive control and sensor information from the assisted vessel via the interface unit. The interface unit may be placed on the assisted vessel. The master dynamic positioning system may receive information from an inertial navigation system provided in the interface unit. The inertial navigation system may comprise a global positioning system and a motion reference unit.

The invention also provides a computer program for performing the method as defined above.

The invention also provides a tugboat provided with a master dynamic positioning system, wherein the master dynamic positioning system is adapted to control a number of tugboats as one unit for assisting in maneuvering of an assisted vessel having thrust capabilities and to control the thrust capabilities on board the assisted vessel. The master dynamic positioning system may be connectable to an interface unit enabling control of the thrust capabilities on board the assisted vessel. The tugboat may comprise an interface unit as described above.

The interface unit can link into a pre-existing ship automation and control system on an assisted vessel and transmit data from sensors and controls of the assisted vessel to a master dynamic positioning (DP) system. The master dynamic positioning (DP) system can also transmit commands back to the assisted vessel.

The master dynamic positioning DP system controls a number of auxiliary vessels and also the thrust capabilities of the assisted vessel. The thrust capabilities of an assisted vessel may be considered as the main propulsion, rudders, and bow thrusters. As the master dynamic positioning system also controls the thrust capabilities of the assisted vessel, this greatly improves the ability to execute the desired maneuver. The desired maneuver may e.g. be station keeping or maneuvering in hazardous waters. All data and control information that can aid the master DP system to control the movement of the assisted vessel better in order to accomplish its mission with the assisted vessel, may be transmitted from the assisted vessel to the master DP system.

The interface unit may also include an Inertial Navigation System (INS). The Inertial Navigation System uses a Motion Reference Unit (MRU) to determine accelerations, speed/heading, and ultimately location. The Inertial Navigation System can also incorporate GPS data as a reference to provide very accurate measurements. By incorporating this into the interface unit, the actual movements of the vessel may be taken into account by the master dynamic positioning (DP) system in the maneuvering of the tugs and assisted control of the assisted vessel's thrust capabilities. This increases both the safety and efficiency in the mission of assisting the vessel.

As the interface unit enables communication between the different control and sensor systems on board the assisted vessel and the master dynamic positioning system of the tugboats, the assisted vessel becomes part of the dynamic positioning eco-system of the tugboats and allows the assisted vessel to become part of this multi-unit system.

The invention provides increased efficiency and increased safety in assisted maneuvering operations. The interaction between the assisted vessel control and sensor systems and the master dynamic positioning (DP) system controlling the tugboats considerably reduces or even removes the potential for misunderstandings between the assisted vessel and the tugboats that previously could result in inefficient maneuvering or even accidents. The invention may also reduce the number of tugboats needed for an assisting operation as the master dynamic positioning (DP) system also controls the thrust capabilities of the assisted vessel at the same time as operating the tugboats as one unit. Increased automation in the performance of the mission also enables cost efficient operation with reduced fuel consumption.

BRIEF DESCRIPTION OF DRAWINGS

Example embodiments of the invention will now be described with reference to the following drawings, where.

DETAILED DESCRIPTION

Figure 1:
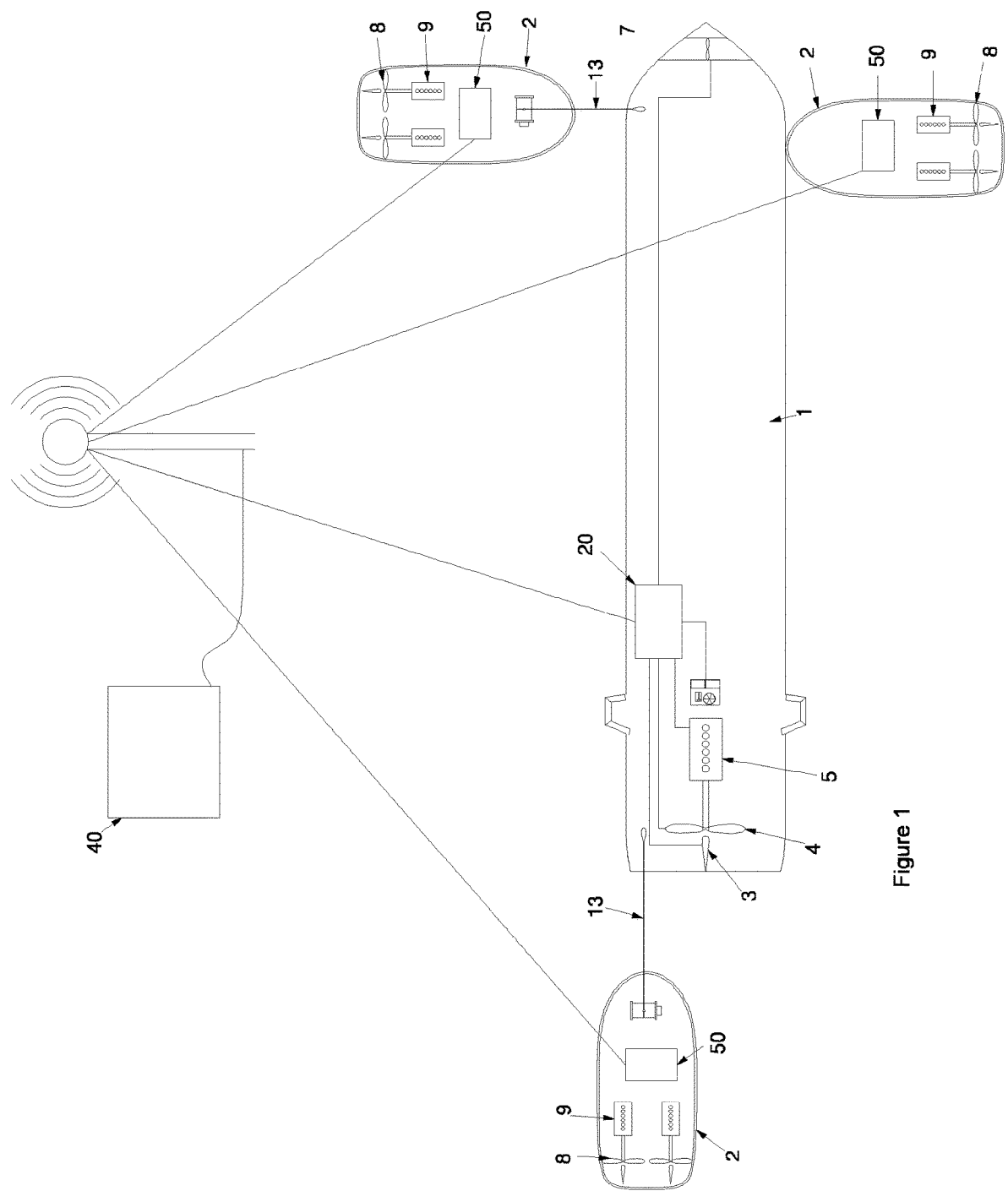
FIG. 1 illustrates three tugboats with dynamic positioning DP systems and a master dynamic positioning DP system working together to assist a vessel.

The present invention will be described with reference to the drawings. The same reference numerals are used for the same or similar features in all the drawings and throughout the description.

FIG. 1 is a perspective view illustrating a vessel 1 to be assisted by three tugboats 2 (auxiliary vessels). The tugboats 2 assists the vessel 1 in its desired maneuvering operation to enable the vessel to control the desired position and heading. The vessel may require such assistance during e.g. difficult maneuvering operations, such as in a harbour, in a narrow canal, in hazardous areas, or during rescue operations of the vessel.

The assisted vessel 1 is provided with its own thrust capabilities 3 as required by its specific mission. The thrust capabilities 3 of an assisted vessel may be considered as the main propulsion 4, rudders 6, and bow thrusters 7. The thrust capabilities may therefore include, but not be limited to, rudder(s), propeller(s), azimuthing thrusters, waterjets, or tunnel thrusters (TT). The azimuthing thrusters may be a main propulsion or a support propulsion of the assisted vessel. The tunnel thruster (tt) is a fixed thruster able to provide lateral power and are often in a bow or stern location. The power system of the assisted vessel may be, but not limited to, mechanical, electrical, and/or hybrid configuration.

The tugboats 2 are controlled to act together as one unit by a master dynamic positioning system 40. The master dynamic positioning system 40 has a mission to be executed with the assisted vessel 1 to assist the ship in its maneuvering operations as explained above. Mission input data may comprise information on at least one of desired position, speed, heading, path or trajectory to be achieved for the assisted vessel. The master dynamic positioning system 40 may coordinate the auxiliary vessels 2 as one unit in all phases of the towing operation; including but not limited to: approach of the assisted vessel, touching the assisted vessel, assisting in station keeping, maneuvering of the assisted vessel both in towing operation and in harbour, docking and mooring.

The master dynamic positioning system 40 may be placed on one of the auxiliary vessels 2 or on a land based facility 12.

Each tugboat is provided with a dynamic positioning system (DP system) 50 controlling the position, speed, and heading of the tugboat. The master dynamic positioning system 40 controls the tugboats 2 as one unit by instructing the dynamic positioning systems 50 of each tugboat for maneuvering each of the tugs 2. The master dynamic positioning control system 41 outputs movement instructions to the dynamic positioning systems 50 of each tugboat. The dynamic positioning systems 50 of each tugboat process these movement instructions and adapt the control parameters of each tug to assist the vessel as needed. The control parameters of each tug may include, but is not limited to; speed, force and direction of the propulsion for each tugboat to achieve a resulting direction and strength of the forces on the assisted vessel from the combined pushing/pulling force and direction(s) of the push/pull by each of the tugboats. Also, external environmental forces such as wind, current and waves, may be taken into account by the dynamic positioning system of each tug boat. Further control parameters may therefore also include wind direction and wind speed, current direction and speed, and wave height and direction and speed.

For efficient and safe maneuvering of the assisted vessel, the tugboats, acting as one unit, must work together with the assisted vessel. In order to accomplish the mission, the master dynamic positioning system controls the auxiliary vessels 2 (e.g. tugboats) as one unit for assisting in maneuvering of the assisted vessel 1 and also controls the thrust capabilities 3 of the assisted vessel 1. The master dynamic positioning system 40 may thus execute its mission with the assisted vessel 1 by also providing thrust to the assisted vessel through the thrust capabilities 3 of the assisted vessel itself.

The assisted vessel 1 is provided with a control system and sensor systems. To enable control of the thrust capabilities on-board the assisted vessel by the master dynamic positioning system, the commands from the master dynamic positioning system 40 are communicated to the thrust capabilities control systems on-board the assisted vessel. Also, the master dynamic positioning system 40 should be allowed access to the control and sensor systems 10 on board the assisted vessel for use in accomplishing the mission with the assisted vessel.

The master dynamic positioning system 40 controls the auxiliary vessels 2 as one unit and controls the thrust capabilities 3 of the assisted vessel 1 to solve the mission of assisting in maneuvering of the assisted vessel taking into account the received control and sensor system parameters from the assisted vessel. The assisted vessel 1 may thus operate as a slave to the master dynamic positioning system allowing the assisted vessel to maneuver better both by using the thrust capabilities 3 of the assisted vessel itself and by using the external thrust forces 9 from the tugboats 2.

As explained, all vessels have different levels of autonomy and different control and sensor systems. The control and sensor systems on board vessels to be assisted may have huge variations in the number of sensor and control systems, type of sensor and control systems, and the control and sensor systems may be digital or analogue or have a combination of analogue and digital systems. The master dynamic positioning system for the tugboats may not directly communicate with the different control and sensor systems on board the assisted vessel.

Figure 2:
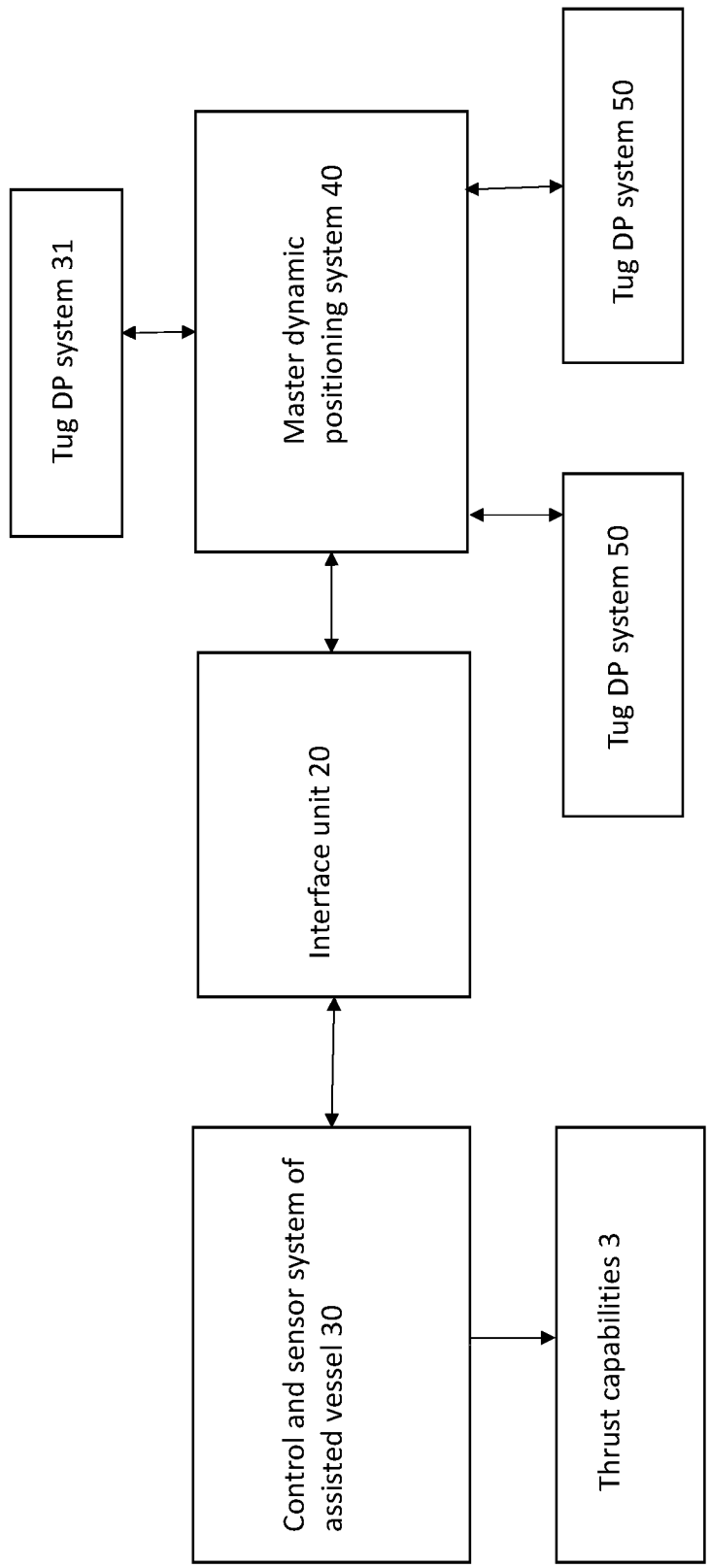
FIG. 2 illustrates an example of an interface between a master dynamic positioning system and a control and sensor system of an assisted vessel.
Figure 3:
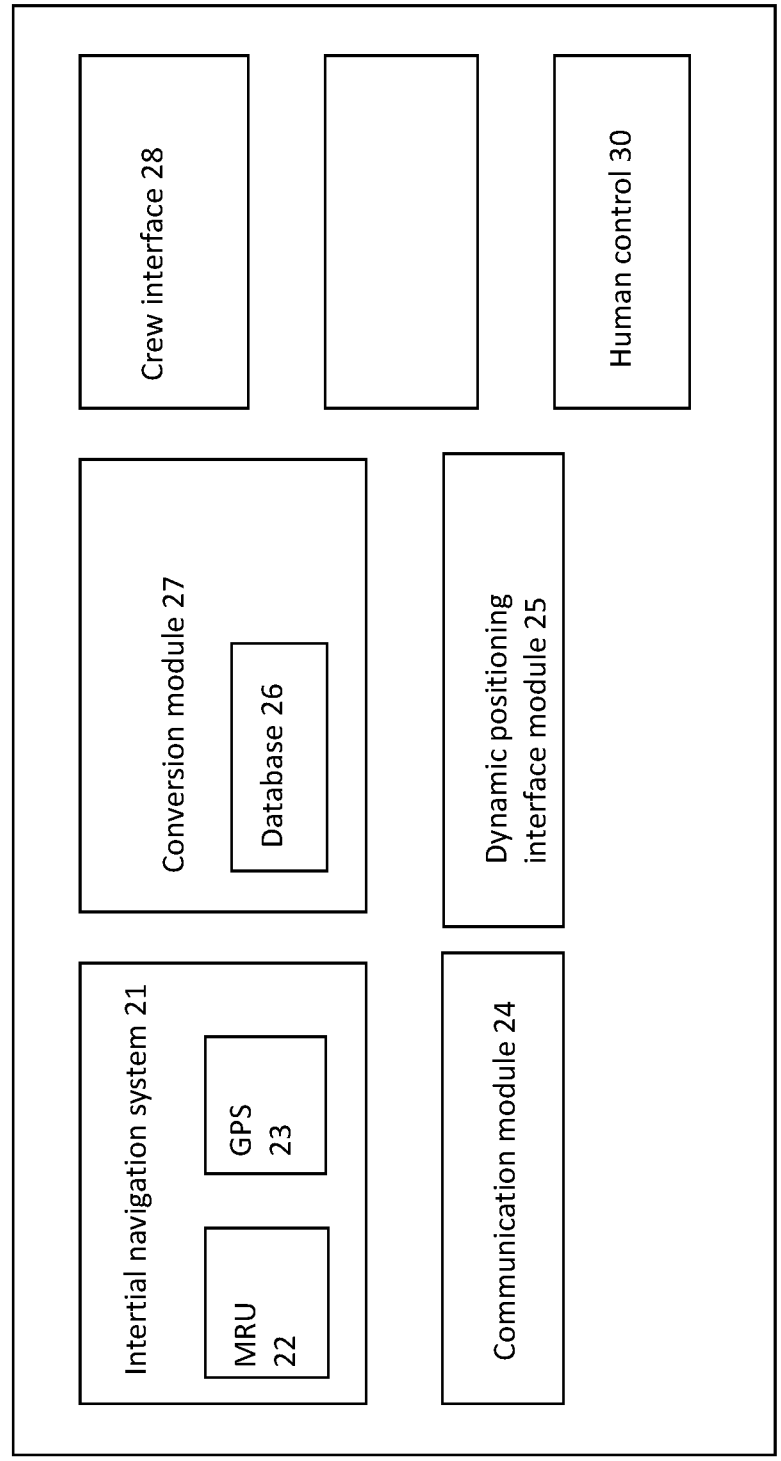
FIG. 3 illustrates an example of an interface unit with inertial navigation system, communication module, connector module, conversion module and dynamic positioning DP interface module.

An interface unit 20 is provided serving as a link between the control and sensor systems 10 on board the assisted ship 1 and the master dynamic positioning system 40 for the tugboats as illustrated in FIG. 2. An embodiment of an interface unit is illustrated in FIG. 3. The interface unit 20 includes a communication module 24 configured to communicate with the control and sensor system 10 on board the assisted vessel. The interface unit 20 may thus link into a pre-existing control and sensor system 10 of the assisted vessel 1, transmit data from the sensors and control systems of the assisted vessel to the master dynamic positioning system 40 and transmit control commands and information from the master dynamic positioning system 40 to the assisted vessel 1.

The interface unit 1 is designed to be easily connected to the control and sensor systems 10 on board the assisted vessel. The interface unit may include a communication module 24 for connecting to the control and sensor systems 10. The control and sensor systems normally have a physical interface centralized on the bridge of the vessel. The connection may be physical/mechanical or wireless. The connection may be secure or non-secure. The communication module 24 is designed to be able to connect to the most common bridge solutions for control and sensor systems on board a vessel. The communication 24 module may be provided with a multi-connector system for physical/mechanical connection. The communication module 24 may be connected to the master dynamic positioning system 40 on the tugboat through a cable, a wire, an optical fibre, or wirelessly. A physical solution may use any suitable data communication protocol. A wireless solution may be based on wireless communication with the control and sensor system on the bridge through a standard communication protocol, which may be secure or non-secure. The wireless communication may utilize any suitable wireless data communication protocol, e.g. but not limited to cellular data services, mobile satellite communication, wireless sensor network protocols or Wi-Fi. Exemplary cellular data service protocols includes, but is not limited to, Global System for Mobile Communications (GSM), Code division multiple access (CDMA), General Packet Radio Service (GPRS), Universal Mobile Telecommunications System (UMTS), CDMA2000, Enhanced Data rates for GSM Evolution (EDGE), Mobile WiMAX, Long Term Evolution (LTE).

A secure communication is the preferred way of communication between all the parties involved in the mission of assisting the vessel. Secure communication is preferred between the master dynamic positioning system 40, the assisted vessel 1 and the dynamic positioning systems 50 on the tugboats 2. An open communication is vulnerable for cyber crime attacks, e.g. hacking. Cyber crime attacks may result in hostile take-over of the assisted vessel by third parties e.g. maneuvering the vessel to a different destination, causing accidents by collision with other vessels or maneuvering the vessel onshore or on underwater hazards, which in addition to loss of lives, may also cause huge environmental disasters. Unauthorized third parties may be crew on board other hostile vessels arriving at the assisting vessel, or be located anywhere in the world accessing the communication channels by cyber hacking, use of malicious computer programs like computer viruses, worms, ransomware, CryptoLocker or Trojans or other unauthorized data programs infecting the interface unit. Cyber crime attacks may also cause malicious instructions to be issued by the interface unit or result in failure or malfunction of the interface unit. Secure communication between the authorized parties in the towing operation assisting the vessel is preferred for cabled, wireless and optical fibre solutions.

Cyber security measures may be implemented in at least one of hardware, firmware or software components of the interface unit 20 and/or master dynamic positioning system 40 and the sensor and control system 10 on board the assisted vessel 1. Cyber security measures may involve, but is not limited to, e.g. user access control, cryptography, firewalls, intrusion detection systems, two-factor authentication etc. Secure communication may involve, but is not limited to, cryptographic security; emission security; transmission security, physical security; encryption of communication signals, secure instant messaging, client-to-server encryption or Voice over secure internet protocol (VOSIP).

The interface unit 20 can be portable. A portable interface unit can be brought on board the assisted vessel by e.g. a pilot coming on board for assisting the crew in maneuvering the assisted vessel in waters where a pilot is required. The portable interface unit may also be brought on board the assisted vessel by crew on the tugboats arriving for assisting the vessel. The portable interface unit may also be attached to the assisted vessel by e.g. a crane on board one of the tugboats without human intervention, or transported and/or attached to the assisted vessel by use of a drone. The interface unit may also be stationary, and purchased and installed on the assisted vessel to enable any tugboats with a master dynamic positioning system to communicate with the interface unit when arriving at the vessel for assistance.

The interface unit 20 may also be installed on tugboats without dynamic positioning systems arriving for assisting in the mission the master dynamic positioning system 40 has with the assisted vessel 1. These tugboats may then also become a part of the dynamic positioning ecosystem controlled by the master dynamic positioning system. These interface units will have a designation an assisting vessel rather than as an assisted vessel so that the master dynamic positioning system will handle them correctly in executing the desired mission.

The interface unit 20 may also be placed on board a tug together with the master dynamic positioning system 40. When the tug is approaching the vessel to be assisted, a handshake procedure between the communication module 24 of the interface unit 20 and the assisted vessel control and sensor systems 10 may be initiated for connection of the interface unit 20 to the assisted vessel control and sensor systems. This procedure may be initiated manually by the tug crew and confirmed manually by the assisted vessel crew. However, also any combination of automatic, semi-automatic or manual initiation by the tugboat and semi-automatic or manual confirmation by the assisted vessel crew is possible. A drone may also be used for delivering a physical connection to the assisted vessel. The physical connection may then be coupled to the control and sensor systems enabling wireless communication with the master dynamic positioning system on board the tug.

The interface unit includes a conversion module 27 for converting the control and sensor system signals provided by the control and sensor systems 10 on board the assisted vessel 1 to a signal understandable for the master dynamic positioning system 40. The conversion module 27 also converts the commands from the master dynamic positioning system to signals understandable for the control and sensor systems 10 on board the assisted vessel 1. The interface unit 20 may be provided with processor, memory and software for converting the control and sensor signals and the commands from the master dynamic positioning system as explained above. The conversion module 27 may include a database 26 with information for converting the control and sensor signals for all the different control and sensor systems used in vessels and for converting the commands from the master dynamic positioning system to signals understandable for all the control and sensor systems. Alternatively, the conversion module may include physical electronic components for performing the conversion. Conversion may also be performed in a signal generator. The conversion module may automatically recognize the type of control and sensor system after connecting the interface unit to the control and sensor system. Alternatively, the type of control and sensor system on board the assisted vessel may be manually selected e.g. in a display on the interface unit, or by selecting a switch on the interface unit.

The interface unit also includes a dynamic positioning interface module 25 transmitting the converted control and sensor signals to the master dynamic positioning system 40 and receiving the commands from the master dynamic positioning system 40. The transmission may be cabled or wireless. The transmission may be secure or non-secure. When the interface unit 20 is on board the assisted vessel, the transmission is preferably wireless via a secure connection. The wireless transmission may be performed through any suitable standard wireless communication protocol, which may be secure or non-secure, e.g. wireless data communication protocol for cellular data services, mobile satellite communication, wireless sensor network protocols or Wi-Fi. The cabled transmission may also be performed by standard communication protocols. Examples of such protocols have been identified above for the interface with the assisted vessel systems.

The interface unit 20 in FIG. 2 also includes an inertial navigation system 21. The inertial navigation system further incorporates a global positioning system 23 (GPS) and a motion reference unit 22 (MRU). The motion reference unit 22 (MRU) determines acceleration, speed/heading, and ultimately location. The motion reference unit (MRU) allows motion sensor capability that the sea going vessels do not commonly have today. The incorporated GPS system 23 is a specialized GPS having improved accuracy. The motion reference unit 22 (MRU) may comprise any type of motion sensor, preferably providing six-degree of freedom motion information of the vessels' motion. A motion reference unit 22 is preferred when the interface unit is placed onboard the assisted vessel, as the master dynamic positioning system then receives information about the actual movements of the assisted vessel and which may then be taken into account in the maneuvering of the tugs and the control of the thrust capabilities on board the assisted vessel. This may be in e.g. rough sea where the tugs must be careful not to collide with the assisted vessel hull or uncontrollably hit the assisted vessel hull, or avoid shock loads in the tow rope 13. Another example, the tugs should assist the vessel in safe maneuvering where e.g. excessive tilt should be avoided. The input(s) for the control system and sensor system parameters described above transmitted to the master dynamic positioning system 40 may also be manually input by the crew on board the assisted vessel. The interface unit may also be configured to enable human control 30 of the master dynamic positioning system. Human control may comprise commands from e.g. a ship captain, a pilot, a tug master or shore based operators.

The commands from the master dynamic positioning system 40 may be transmitted to the control and sensor systems 10 on board the assisted vessel as explained above. The commands from the master dynamic positioning system may also be given to the crew on the bridge for manually operating the assisted vessel 1 according to the commands of the master dynamic positioning system 40. A crew interface with the master dynamic positioning system may thus be provided on the bridge. The crew interface 28 may be included in the interface unit 20 as illustrated in FIG. 3. The commands from the dynamic positioning system may be visual or audio commands. The visual commands may e.g. be provided through a display and the audio commands e.g. through a loudspeaker, headset or earphones. The crew interface may e.g. be in the form of a display, a portable computer, a touch screen, a smart phone, or a tablet etc.

The crew interface 28 may also enable the crew to provide input to the master dynamic positioning system physically e.g. through a keyboard, joystick or touchscreen, or by voice through e.g. a microphone. The crew interface 28 may also provide the crew with information from the master dynamic positioning system 40 also when the master dynamic positioning system 40 is in an automatic control mode controlling directly the thrust capabilities 3 on board the assisted vessel 1. The master dynamic positioning system 40 may also operate in semiautomatic control modes, partly involving the crew on the assisted vessel. The tugboats 2 may also be operated in automatic, semiautomatic or manual control modes.

The control system controls a number of control parameters e.g. at least one of a rudder angle of the assisted vessel, a pitch angle of the controllable pitch propeller (CPP) of the assisted vessel, a propeller revolutions per minute (RPM) of the assisted vessel, an engine revolutions per minute (RPM) of the assisted vessel, an engine power of the assisted vessel, a thruster angle of the assisted vessel, a revolutions per minute (RPM) of the thrusters of the assisted vessel, or a thruster power of the assisted vessel.

The sensor system provides a number of sensor parameters, e.g. from at least one of sensors for detecting position, speed or heading. The information from the control and sensor systems 10 of the assisted vessel may also include at least one of a rudder angle of the assisted vessel, a pitch angle of the controllable pitch propeller (CPP) of the assisted vessel, a propeller revolutions per minute (RPM) of the assisted vessel, an engine revolutions per minute (RPM) of the assisted vessel, an engine power of the assisted vessel, a thruster angle of the assisted vessel, a revolutions per minute (RPM) of thrusters of the assisted vessel, or a thruster power of the assisted vessel.

For azimuthing thrusters control parameters may e.g. relate to at least one of thruster angle, controllable pitch propeller (CPP) angle, revolutions per minute (RPM) or motor power. For tunnel thrusters (tt) control parameters may e.g. be at least one of controllable pitch propeller (CPP) angle, propeller revolutions per minute (RPM), motor power, or direction of thrust. For a shaft line propeller the control parameters may e.g. include at least one of rudder angle, shaft revolutions per minute (RPM), engine revolutions per minute (RPM), or engine power. The control and sensor system information may further include at least one of a global position (GPS) of the assisted vessel, a speed of the assisted vessel, a heading of the assisted vessel, or AIS (Automatic Identification System) assisted parameters such as geometry and load conditions.

An example of a control system on an assisted vessel may be an Acon (Automation control) system. Such systems are integrated automation systems for control and monitoring of ship equipment and machinery. Graphical pictures with necessary information are displayed on a man-machine interface, and makes the system easy to operate for the crew.

The control systems typically have an alarm and monitoring system giving information to the crew about the machinery equipment's condition. Such systems may also include e.g. a dead man system, pump and valve control, a control and overview system for cargo handling and/or machinery systems or vessel tank level gauging system.

The interface unit 20 may also convey control parameters from the master dynamic positioning system to the assisted vessel for monitoring purposes. Monitoring may be manually performed by the pilot or crew on board the vessel e.g. through a visual interface. If the interface unit 20 is permanently installed on the assisted vessel 1, the control parameters from the master dynamic positioning system 40 may also be displayed in a physical interface of the control and sensor system, e.g. a visual indication of the assisted vessel and auxiliary vessel positions along with navigational and a number of control parameters.

As an example of semiautomatic control by the master dynamic positioning system 40, the commands from the master dynamic positioning system for controlling the thrust capabilities 3 of the assisted vessel 1 may include commands for at least one of propeller revolutions per minute (RPM), engine power, controllable pitch propeller (CPP) pitch, rudder angel, bow thrust or stern thrust. The crew may receive commands from the master dynamic positioning system through the interface unit 20 for controlling the rudder 6 angle and engine 9 power manually.

The crew on board the assisted vessel and the tugboats may be humans, humanoids, robots or robots with artificial intelligence.

The master dynamic positioning system 40 receives a plurality of input parameters from the control and sensor system 10 on board the vessel via the interface unit 20. Based on the plurality of input parameters the master dynamic positioning control system controls the position of the each of the tugboats and control the thrust capabilities on board the assisted vessel. If the control and sensor systems on board the assisted vessel are not functioning, e.g. in a blackout or emergency situation, the master dynamic positioning control system may receive the plurality of input parameters from sensors and navigational systems on board the tugs, and from this information determine and coordinate the movement of each tug as one unit in order to move the assisted vessel.

Figure 4:
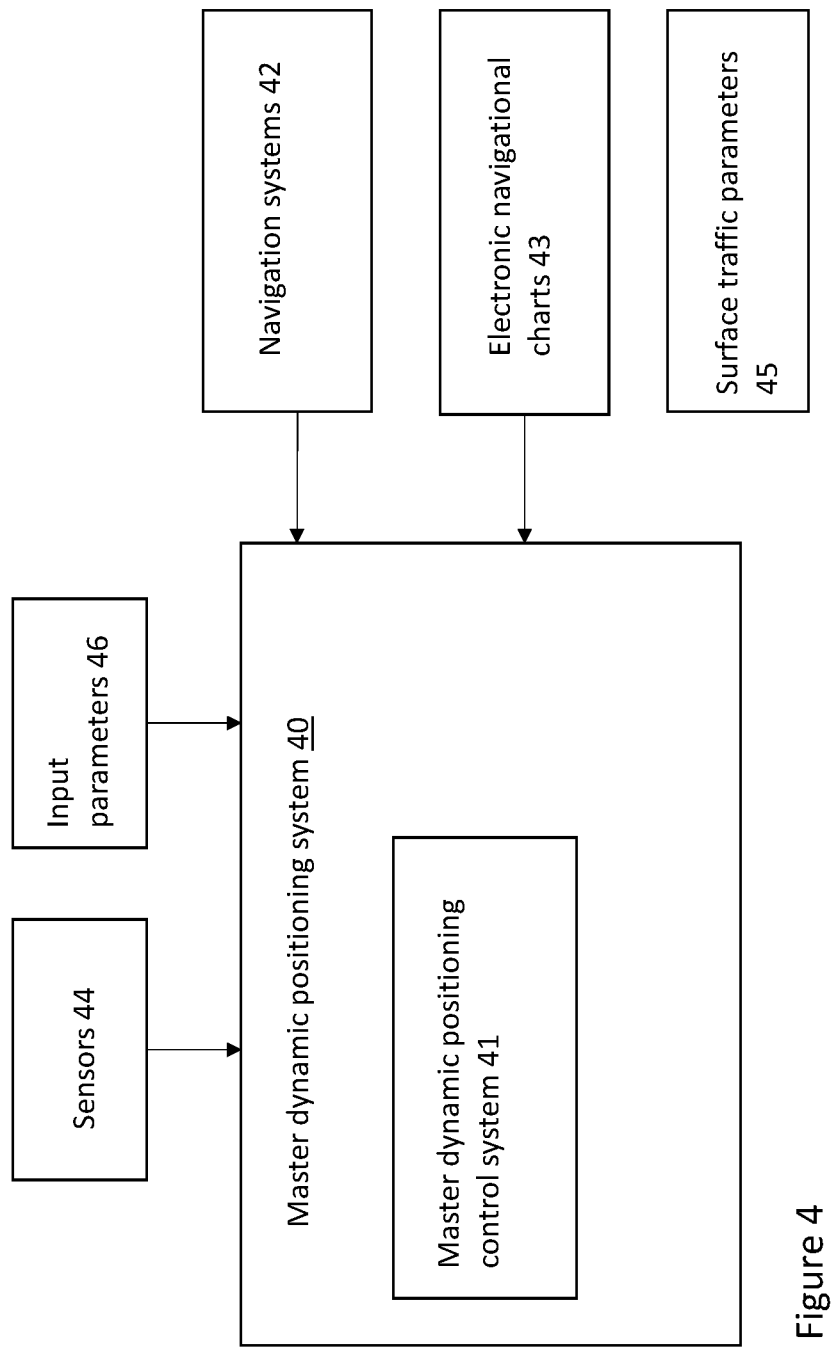
FIG. 4 illustrates an exemplary master dynamic positioning DP system.

FIG. 4 illustrates an exemplary master dynamic positioning system. The master dynamic positioning control system may check parameters relating to the actual position of the assisted vessel relative to land, rocks and other fixed hazards. The actual position parameters may be obtained from navigation systems on board the assisted vessel or the tugboats, or from a navigational system 42 connected to the master control system. The navigation system may be a ground based radio navigation system, such as DECCA, LORAN, GEE and Omega, or a satellite navigation systems, such as GPS, GLONASS, Galileo and BeiDou. In the case of satellite navigation systems, the accuracy of the actual location may be improved by input to the master dynamic positioning control system from a Differential Global Positioning System (DGPS). The master dynamic positioning control system 40 may also receive input parameters from electronic navigational charts 43. Combined with input parameters from the navigation systems 42, this allows the dynamic positioning control system 41 to determine movement instructions that safely controls the tug and assisted vessel from colliding with land, rocks and other fixed hazards. For this purpose, the dynamic positioning control system 41 may also receive input parameters from other sensors 44 such as a sonar, marine radar, and/or an optical system using a camera. The sonar may provide information about underwater hazards such as land, rocks, underwater vessel etc. The marine radar and/or optical system may provide information about overwater hazards such as land and other surface vessels or floating objects. The marine radar and/or optical system may also provide navigation information from sea marks such as beacons, buoys, racons, cairns and lighthouses. If the master dynamic positioning control system determines that the assisted vessel is too close to any fixed hazards, the master dynamic positioning control system outputs movement instructions to move the assisted vessel safely away from the fixed hazards.

The master dynamic positioning control system 41 may also check parameters relating to the position of the assisted vessel relative to other surface traffic, evaluate the surface traffic parameters 45 in view of relevant navigational rules. The tug should comply with navigational rules for preventing collision with other ships or vessels. A database comprising the relevant navigational rules for an operation location of the tug may be included in the master dynamic positioning control system 41. If the master dynamic positioning control system determines that the assisted vessel should move away from other surface traffic, the master dynamic positioning control system outputs movement instructions to move the assisted vessel accordingly. Wind, waves and sea currents may act on the assisted vessel and auxiliary vessel and cause the assisted vessel to move from the desired location or path. This information is taken into account in assisting the vessel. This information may include at least one of meteorological parameters and environmental input parameters such as wind direction, wind strength, water temperature, air temperature, barometric pressure, wave height etc. These input parameters may be provided by relevant sensors 44 connected to the control system such as an anemometer, temperature sensor, atmospheric pressure sensor etc. The master dynamic positioning system may calculate the drift and outputs movement instructions to counteract the drift. Other input parameters to calculate the drift may include data from movement sensors such as a gyro, an accelerometer, a gyrocompass and a turn-rate indicator.

Input parameters 46 may also include at least one of speed, heading or position of the tugboats. The tugboats may act on the assisted vessel also by towing ropes or wires 13, and input parameters may include at least one of rope/wire tension or winch capacity. The input parameters may be provided by relevant sensors connected to the master dynamic positioning control system, or to the dynamic positioning system of each tugboat or sensors in the sensor system on board the assisted vessel, which then are communicated to the master dynamic positioning system. The input parameters may be received by the master dynamic positioning control system by wired connections or wireless connections, mobile or satellite communication, or any suitable wireless data communication protocol, such as wireless sensor network protocols or Wi-Fi as described above.

Movement of the assisted vessel may also be calculated from actual position parameters of the assisted vessel relative to the desired location either manually, partly manually or by the control system. The actual position parameters may be obtained from navigation systems connected to the control system. The navigation system may be a ground based radio navigation system, such as DECCA, LORAN, GEE and Omega, or a satellite navigation systems, such as GPS, GLONASS, Galileo and BeiDou. In the case of satellite navigation systems, the accuracy of the actual location may be improved by input to the dynamic positioning control system from a Differential Global Positioning System (DGPS).

The control system may also receive input parameters from electronic navigational charts. Combined with input parameters from the navigation systems, this allows determining movement instructions that safely controls the assisted vessel from colliding with land, rocks and other fixed hazards. A sonar, marine radar, and/or an optical system using a camera also provide parameters that are taken into account for safely maneuvering the vessel to its destination. The sonar may provide information about underwater hazards such as land, rocks, underwater vessel etc. The marine radar and/or optical system may provide information about overwater hazards such as land and other surface vessels or floating objects. The marine radar and/or optical system may also provide navigation information from sea marks such as beacons, buoys, racons, cairns and lighthouses. The optical sensors may observe and recognize other surface vessels. The input parameters relating to surface traffic may be provided by sensors and systems such as a marine radar, an Automatic Identification System (AIS) and an automatic radar plotting aid (ARPA), or may be provided by optical sensors such as a camera. Observations of surface traffic and navigation information may also be visually observed by the crew on board the assisted vessel.

In national and international waters, the assisted vessel should comply with respective national and international navigational rules for preventing collision with other ships or vessels. Compliance of the navigational rules may be performed by the crew, by the control system or by the master dynamic positioning system. A database comprising the relevant navigational rules for an operation location of the assisted vessel may be included in the control system on the assisted vessel and provided to the master dynamic positioning system or may be included in the master dynamic positioning system. The master dynamic positioning system may also receive input parameters relating to other surface traffic, and evaluate the surface traffic parameters in view of the relevant navigational rules, when determining when and where the assisted vessel should be moved and the desired position, trajectory, heading and speed.

The master dynamic positioning system and the functions of the interface unit may be implemented as software or hardware or a combination of software and hardware. The software may be implemented to be executed in a computer having at least one processor and at least one memory. An operating system runs on the at least one processor. Custom programs, controlled by the system, are moved into and out of memory. The system may further contain a removable memory component for transferring images, maps, instructions or programs.

The software may be stored on a computer readable medium.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. An interface unit providing an interface between a control and sensor system of an assisted vessel with thrust capabilities and a master dynamic positioning system, wherein the master dynamic positioning system is configured to control a number of auxiliary vessels as one unit and control the thrust capabilities of the assisted vessel for assisting in maneuvering of the assisted vessel, and wherein the interface unit is adapted to transmit from the control and sensor system of the assisted vessel to the master dynamic positioning system information that includes at least one of:
a rudder angle of the assisted vessel;
a pitch angle of the controllable pitch propeller of the assisted vessel;
a propeller revolutions per minute of the assisted vessel;
an engine revolutions per minute of the assisted vessel;
an engine power of the assisted vessel;
a thruster angle of the assisted vessel;
a thruster revolutions per minute of the assisted vessel; and
a thruster power of the assisted vessel.

2. The interface unit according to claim 1, further comprising an inertial navigation system.

3. The interface unit according to claim 2, wherein the inertial navigation system comprising a global positioning system and a motion reference unit.

4. The interface unit according to claim 1, wherein the master dynamic positioning system is placed on one of the auxiliary vessels or on a land based facility.

5. The interface unit according to claim 1, wherein the information from the control and sensor system of the assisted vessel transmitted to the master dynamic positioning system includes at least one of:
global position of the assisted vessel;
a speed of the assisted vessel;
a heading of the assisted vessel; or
automatic identification system assisted parameters.

6. The interface unit according to claim 1, wherein the interface unit is portable.

7. The interface unit according to claim 1, wherein the interface unit is easily connectable to the control and sensor systems on board the assisted vessel.

8. The interface unit according to claim 1, wherein the interface unit is configured to transmit commands from the master dynamic positioning system to the control and sensor system of the assisted vessel to control the thrust capabilities of the assisted vessel.

9. The interface unit according to claim 1, wherein the interface unit is configured to enable human control of the master dynamic positioning system.

10. The interface unit according to claim 9, where human control comprises commands from a ship captain, a pilot, a tug master or shore based operators.

11. The interface unit according to claim 1, wherein the interface unit is configured to provide audio or visual commands to a crew on board the assisted vessel for control by the crew of the thrust capabilities of the assisted vessel.

12. The interface unit according to claim 1, further comprising a communication module configured to communicate with the control and sensor system on board the assisted vessel.

13. The interface unit according to claim 1, further comprising a dynamic positioning interface module configured to communicate with the master dynamic positioning system.

14. The interface unit according to claim 1, further comprising a conversion module configured for converting signals from the control and sensor system on board the vessel to signals understandable by the master dynamic positioning system.

15. The interface unit according to claim 14, wherein the conversion module further comprising a database with conversion information between the control and sensor system on board the assisted vessel and the master dynamic positioning system.

16. The interface unit according to claim 12, wherein the communication module is connectable to the assisted vessel control and sensor system via a cable based or wireless connection.

17. The interface unit according to claim 16, wherein the wireless connection is at least one of satellite, antennae or radio signals.

18. The interface unit according to claim 16, wherein the wireless connection is a secure connection.

19. The interface unit according to claim 12, wherein a secure connection is implemented in the communication between at least one of:
   the dynamic positioning interface module and the master dynamic positioning system;
   the dynamic positioning interface module and the control and sensor system of the assisted vessel; or
   the master dynamic positioning system and one of the auxiliary vessels.

20. The interface unit according to claim 1, wherein the thrust capabilities comprises at least one of a rudder, a propeller, an azimuthing thruster, a waterjet, or a tunnel thruster.

21. The interface unit according to claim 1, wherein the auxiliary vessels are tugboats.

22. A system for assisting in manoeuvring of a vessel with thrust capabilities, the system comprising:
   a master dynamic positioning system controlling a number of auxiliary vessels as one unit for assisting in maneuvering of an assisted vessel, and
   an interface unit providing an interface between a control and sensor system of an assisted vessel with thrust capabilities and the master dynamic positioning system, wherein the master dynamic positioning system is configured to control a number of auxiliary vessels as one unit and control the thrust capabilities of the assisted vessel for assisting in maneuvering of the assisted vessel, and wherein the interface unit is adapted to transmit from the control and sensor system of the assisted vessel to the master dynamic positioning system information that includes at least one of:
   a rudder angle of the assisted vessel;
   a pitch angle of the controllable pitch propeller of the assisted vessel;
   a propeller revolutions per minute of the assisted vessel;
   an engine revolutions per minute of the assisted vessel;
   an engine power of the assisted vessel;
   a thruster angle of the assisted vessel;
   a thruster revolutions per minute of the assisted vessel; and
   a thruster power of the assisted vessel.

23. A method for assisting in manoeuvring of a vessel with thrust capabilities, the method comprising:
   controlling a number of auxiliary vessels as one unit for assisting in manoeuvring of the assisted vessel by controlling a dynamic positioning system of each of the auxiliary vessels by a master dynamic positioning system;
   controlling the thrust capabilities of the assisted vessel by the master dynamic positioning system; and
   receiving by the master dynamic positioning system, control and sensor information from the assisted vessel via an interface unit provided with the master dynamic positioning system, wherein the control and sensor information includes at least one of:
   a rudder angle of the assisted vessel;
   a pitch angle of the controllable pitch propeller of the assisted vessel;
   a propeller revolutions per minute of the assisted vessel;
   an engine revolutions per minute of the assisted vessel;
   an engine power of the assisted vessel;
   a thruster angle of the assisted vessel;
   a thruster revolutions per minute of the assisted vessel; and
   a thruster power of the assisted vessel.

24. The method according to claim 23, further comprising placing the interface unit on the assisted vessel.

25. The method according to one of claim 23, comprising receiving by the master dynamic positioning system information from an inertial navigation system provided in the interface unit.

26. The method according to claim 25, wherein the inertial navigation system comprises a global positioning system and a motion reference unit.

27. A tugboat provided with a master dynamic positioning system and an interface unit providing an interface between a control and sensor system of an assisted vessel with thrust capabilities and the master dynamic positioning system, wherein the master dynamic positioning system is adapted to control a number of tugboats as one unit for assisting in manoeuvre of an assisted vessel having thrust capabilities and to control the thrust capabilities on board the assisted vessel, and wherein the interface unit is adapted to transmit from the control and sensor system of the assisted vessel to the master dynamic positioning system information that includes at least one of:
   a rudder angle of the assisted vessel;
   a pitch angle of the controllable pitch propeller of the assisted vessel;
   a propeller revolutions per minute of the assisted vessel;
   an engine revolutions per minute of the assisted vessel;
   an engine power of the assisted vessel;
   a thruster angle of the assisted vessel;
   a thruster revolutions per minute of the assisted vessel; and
   a thruster power of the assisted vessel.

28. The tugboat according to claim 27, wherein the master dynamic positioning system is connectable to an interface unit enabling control of the thrust capabilities on board the assisted vessel.

* * * * *